United States Patent
Drabon et al.

(10) Patent No.: US 10,632,809 B2
(45) Date of Patent: Apr. 28, 2020

(54) LEAF SPRING RETAINING ELEMENT FOR A LEAF SPRING MOUNTING PLATE

(71) Applicant: SGL CARBON SE, Wiesbaden (DE)

(72) Inventors: Rodscha Drabon, Salzkotten (DE); Ullrich Hammelmaier, Paderborn (DE); Torsten Howe, Lage (DE); Peter Koczar, Wiesbaden (DE); Thomas Lange, Essen (DE); Dirk Rochell, Paderborn (DE)

(73) Assignee: SGL CARBON SE, Wiesbaden (DE)

( * ) Notice: Subject to any disclaimer, the term of this patent is extended or adjusted under 35 U.S.C. 154(b) by 0 days.

(21) Appl. No.: 15/332,917

(22) Filed: Oct. 24, 2016

(65) Prior Publication Data

US 2017/0113504 A1    Apr. 27, 2017

(30) Foreign Application Priority Data

Oct. 26, 2015   (DE) .......................... 10 2015 118 243

(51) Int. Cl.
| | |
|---|---|
| *B60G 11/12* | (2006.01) |
| *B60G 11/04* | (2006.01) |
| *B60G 11/08* | (2006.01) |
| *B60G 11/10* | (2006.01) |

(52) U.S. Cl.
CPC .............. *B60G 11/12* (2013.01); *B60G 11/04* (2013.01); *B60G 11/08* (2013.01); *B60G 11/10* (2013.01); *B60G 2202/11* (2013.01); *B60G 2202/112* (2013.01); *B60G 2202/114* (2013.01); *B60G 2204/121* (2013.01); *B60G 2204/41* (2013.01); *B60G 2206/428* (2013.01); *B60G 2206/73* (2013.01)

(58) Field of Classification Search
CPC ......... B60G 11/10; B60G 11/12; B60G 11/42; B60G 2202/11; B60G 2204/41; B60G 2204/121; B60G 2206/73; B60G 2206/428
USPC ..................................... 267/269, 30, 45, 276
See application file for complete search history.

(56) References Cited

U.S. PATENT DOCUMENTS

| | | | | |
|---|---|---|---|---|
| 1,536,981 A | * | 5/1925 | Stossel ................... | B60G 7/005 267/266 |
| 1,540,500 A | * | 6/1925 | Reed ...................... | B60G 11/42 267/30 |

(Continued)

FOREIGN PATENT DOCUMENTS

| | | |
|---|---|---|
| DE | 197 21 878 A1 | 12/1998 |
| EP | 0 321 178 A1 | 6/1989 |

(Continued)

*Primary Examiner* — Robert A. Siconolfi
*Assistant Examiner* — San M Aung
(74) *Attorney, Agent, or Firm* — Holland & Hart LLP (57) ABSTRACT

The disclosure relates to a leaf spring retaining element for rotationally and elastically mounting a leaf spring end of a leaf spring on a vehicle structure. The leaf spring retaining element includes a leaf spring mounting part having a receiving recess to accommodate the leaf spring end; an elastomer molded part configured to rotationally and elastically mount the leaf spring end, wherein the elastomer molded part is arranged in the receiving recess and shaped to at least partially enclose the leaf spring end; and a bearing configured to support the leaf spring mounting part on the vehicle structure.

15 Claims, 5 Drawing Sheets

(56) References Cited

U.S. PATENT DOCUMENTS

| | | | | | |
|---|---|---|---|---|---|
| 1,605,362 | A | * | 11/1926 | Masury | B60G 11/42 267/30 |
| 1,643,258 | A | * | 9/1927 | Richter | B60G 11/42 267/30 |
| 1,676,489 | A | * | 7/1928 | Geyer | B60G 11/42 267/30 |
| 1,789,725 | A | * | 1/1931 | Chilton | B60G 11/42 267/30 |
| 1,825,352 | A | * | 9/1931 | Jansson | B60G 11/42 267/30 |
| 1,945,595 | A | * | 2/1934 | Chilton | B60G 11/12 267/269 |
| 2,650,089 | A | * | 8/1953 | Martin | B60G 11/42 267/30 |
| 2,831,674 | A | * | 4/1958 | Brown | B60G 11/10 267/266 |
| 4,061,364 | A | * | 12/1977 | Parks | B60G 11/12 280/124.176 |
| 2016/0207369 | A1 | * | 7/2016 | Krahn | F16F 1/26 |

FOREIGN PATENT DOCUMENTS

| | | |
|---|---|---|
| EP | 0 419 208 A2 | 3/1991 |
| JP | H06-43 552 Y2 | 2/1994 |

* cited by examiner

LEAF SPRING RETAINING ELEMENT FOR A LEAF SPRING MOUNTING PLATE

CROSS-REFERENCE TO RELATED APPLICATIONS

The present application claims priority to German Application No. 10 2015 118 243.2, entitled "BLATTFEDERHALTEELEMENT ZUR HALTERUNG EINER BLATTFEDER", filed 26 Oct. 2015, the entirety of which is incorporated herein by reference for all purposes.

BACKGROUND

The present disclosure relates to a leaf spring retaining element for mounting a leaf spring in a vehicle.

A leaf spring designed as a longitudinal leaf spring or as a transverse leaf spring can be used for suspension of a wheel in a vehicle, for example, in a motor vehicle or in a rail vehicle. A leaf spring is often made from a fiber composite and inserted on the end into a retaining element, which is ordinarily mounted to rotate in a chassis component or an auto body. The leaf spring is screwed or clamped into the retaining element so that pulling out of the leaf spring from the retaining element is avoided during compression or rebound. Deformation of the spring during compression or rebound is allowed for by rotational mounting of the retaining element on the vehicle structure. The leaf spring, however, can be highly stressed in the retainer, which is undesired.

SUMMARY

The problem addressed by the present disclosure is therefore to devise an improved concept for mounting a leaf spring.

This problem is solved by the features of the independent claims. Advantageous examples are the object of the description, the dependent claims and the accompanying figures.

The present disclosure is based on the finding that the task can be solved by using a permanently elastic elastomer molded part, which can be loosened between a leaf spring end and a retainer that holds the leaf spring end. The elastomer molded part permits rotationally elastic mounting of the leaf spring end in the retainer based on the elasticity of the elastomer molded part. In the presence of a torque acting on the leaf spring end the elastomer molded part is deformed by the leaf spring end, which results in the twisting or tilting of the leaf spring end in the retainer. In the absence of torque, the leaf spring end returns to the initial position owing to the elasticity of the elastomer molded part. In this way, stress on the leaf spring end in the retainer is reduced, which can lead to longer service life of the connection between the leaf spring end and the retainer and therefore a longer service life of the leaf spring.

According to a first aspect, the disclosure relates to a leaf spring retaining element for rotationally elastic mounting of the leaf spring end of a leaf spring on a vehicle structure, for example, on a chassis component or on an auto body, with a leaf spring mounting part with a receiving recess to accommodate the leaf spring end; an elastomer molded part for rotationally elastic mounting of the leaf spring end, wherein the elastomer molded part is arranged in the receiving recess and shaped to at least partially enclose the leaf spring end; and a bearing to support the leaf spring mounting part on the vehicle structure.

The receiving recess can be opened laterally, for example, so that the leaf spring end is introduced into the receiving recess with the flat top and the flat bottom. The receiving recess, however, can be closed laterally and therefore form a cavity into which the leaf spring end is introduced frontally.

The leaf spring end can be held in the receiving recess by clamping or form-fitting.

The support can be mounted fixed or rotatable on the vehicle structure.

According to one example, the elastomer molded part contains elastomer. Permanent elasticity of the elastomer molded part is ensured by the use of elastomer.

According to one example, the elastomer molded part is bonded to the receiving recess or mounted or clamped to move in the receiving recess.

The elastomer molded part can be bonded in the receiving recess by vulcanization or by gluing. Bonding can also occur by molding the elastomer molded part into the receiving recess. Clamping of the elastomer molded part in the receiving recess can occur by means of the leaf spring end, which holds or clamps the elastomer molded part against a wall of the receiving recess.

According to one example, the elastomer molded part is shaped to accommodate the leaf spring end in form-fit fashion. The leaf spring end can therefore be form-fitted into the elastomer molded part.

According to one example, the elastomer molded part has a receiving space and the leaf spring end can be introduced into the receiving space frontally or laterally. The receiving space, for example, can have the geometric shape of the leaf spring end so that the leaf spring end can be accommodated in form-fit fashion in the receiving space. The receiving space can be opened laterally and have a U-shaped cross section so that the leaf spring end can be introduced laterally or frontally into the receiving space. The receiving space, however, can be closed laterally and form a cavity into which the leaf spring end can be introduced frontally.

According to one example, the elastomer molded part can fully enclose the thickening of the leaf spring end or be molded around it. The elastomer molded part can also thereby accommodate lateral forces.

According to one example, the leaf spring end has a thickening and the receiving space is shaped to accommodate the leaf spring end in form-fit fashion, especially to fully enclose it or to encase it or surround it. The leaf spring end can be closed by a rounded, thickened front. The leaf spring end can also be designed spherical or cylindrical, in which case a cylinder longitudinal axis runs across the leaf spring longitudinal axis. In this way, rotation of the leaf spring end is encouraged in the receiving recess, which is adapted to the form of the leaf spring end.

According to one example, the receiving space is opened or closed laterally. The shape of the elastomer molded part can thereby be adapted to the shape of the receiving recess of the leaf spring mounting part. The receiving space can fully enclose or encase or surround a thickening of the leaf spring end.

According to one example, the leaf spring end can be held by clamping or in form-fit fashion in the leaf spring mounting part. The form-fitted connection can be accomplished by a thickening of the leaf spring end.

According to one example, the leaf spring end can be held with rotational elasticity in the receiving recess by elastic deformation of the elastomer molded part. When a torque acts on the leaf spring end, the elastomer molded part is deformed elastically so that the leaf spring end is moved in the receiving recess. The leaf spring end can optionally be mounted to move in the elastomer molded part so that additional rotation of the leaf spring end in the elastomer molded part is made possible in the elastomer molded part, especially in the case of a cylindrical or spherical thickening of the leaf spring end.

According to one example, the bearing has a plastically deformable impact area to accommodate impact energy. The plastically deformable impact area, for example, can have a number of plastically deformable connectors or walls that at least partially take up the impact energy originating from the leaf spring mounting part by plastic deformation.

According to one example, the bearing can be designed to be rigid and have no plastically deformable impact area.

According to one example, the bearing can be rigidly connected to the vehicle structure or the bearing as a bearing eye for rotatable mounting of the leaf spring retaining element on the vehicle structure. By rotatable mounting of the leaf spring retaining element, the displacement of the leaf spring end during deformation of the leaf spring can be taken into account in addition to the elastic deformation of the elastomer molded part. During rigid mounting of the bearing on the vehicle structure, the displacement of the leaf spring end is taken up by the elastic deformation of the elastomer molded part.

According to one example, the bearing has side arms, which are arranged to the side of the leaf spring mounting part, and the leaf spring retaining element has a locking bracket designed to engage beneath the leaf spring mounting part, whereby the side arms and/or locking bracket can be fastened to the vehicle structure. The locking bracket locks the leaf spring end in the leaf spring mounting part in order to suppress pulling out of the leaf spring end from the leaf spring mounting part.

According to one example, the leaf spring mounting part is formed by a bent sheet metal part in which the receiving recess is formed by deformation of the sheet metal part or the leaf spring mounting part is formed as a single piece with the bearing, especially as a cast part. The receiving recess, for example, can have a shape that is rounded or cylindrical in sections in order to accommodate a cylindrical or rounded leaf spring end in form-fitting or by precise-fitting fashion. The locking bracket can then engage beneath the leaf spring end in order to prevent the leaf spring end from falling out of the receiving recess and to be able to transfer the operating load.

According to a second aspect, the disclosure relates to a leaf spring arrangement with a leaf spring and the leaf spring retaining element according to the first aspect for rotationally elastic mounting of the leaf spring end of the leaf spring on a vehicle structure and a leaf spring or a leaf spring end in which the leaf spring end can be held with rotational elasticity by the elastomer molded part in the receiving recess of the leaf spring retaining element.

According to the first aspect and the second aspect, the elastomer molded part is arranged in the receiving recess of the leaf spring mounting part. The elastomer molded part, however, can be connected to the leaf spring end and enclose the leaf spring end and be bonded to the leaf spring end.

According to a third aspect, the disclosure therefore relates to a leaf spring arrangement in which, in contrast to the leaf spring arrangement according to the second aspect, the elastomer molded part is bonded to the leaf spring end and/or form-fitted with it.

According to a fourth aspect, the disclosure relates to a leaf spring for a vehicle with an elastomer molded part, which encloses a leaf spring end for rotationally elastic mounting of the leaf spring end and is bonded to the leaf spring.

According to one example, the leaf spring end has a thickening, especially a spherical, cylindrical or drop-like thickening.

According to one example, the elastomer molded part can fully enclose the leaf spring end, especially the thickening of the leaf spring end. The elastomer molded part can thereby also take up lateral forces.

According to one example, the elastomer molded part is molded onto the leaf spring end, especially onto a thickening of the leaf spring end so that the thickening is also laterally or completely enclosed or molded around or encased by the elastomer molded part.

BRIEF DESCRIPTION OF THE DRAWINGS

Additional examples of the principles of this disclosure are described further with reference to the accompanying figures. In the figures.

DETAILED DESCRIPTION

Figure 1:
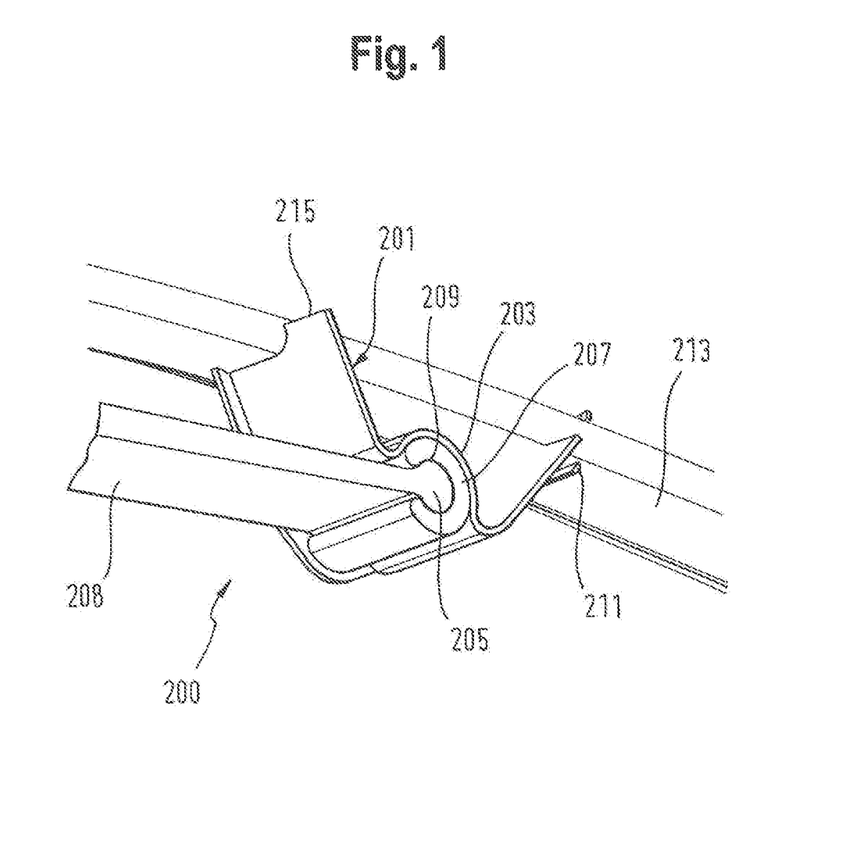
FIG. 1 shows a leaf spring retaining element.

FIG. 1 shows a leaf spring retaining element 200 according to an example. The leaf spring retaining element 200 includes a leaf spring mounting part 201, which has a receiving recess 203 to accommodate a leaf spring end 205 of a leaf spring 208 depicted in FIG. 1. The receiving recess 203, for example, can be formed by deformation of the leaf spring mounting part 201, for example, of a sheet metal cutout.

An elastic elastomer molded part 207 is arranged between the leaf spring end 205 and the receiving recess 203, which is provided for rotationally elastic mounting of the leaf spring end 205. The elastomer molded part 207 can have an elastomer. The elastomer molded part 207 can, for example, include an elastomer or be formed from elastomer. The elastomer molded part 207 can be inserted into the receiving recess 203. According to one example, the elastomer molded part 207 can be bonded to the receiving recess. Bonding can involve vulcanization or result from molding of the elastomer molded part onto the wall of the receiving recess 203.

The receiving recess 203 can be opened laterally. According to one example, the receiving recess 203 can form a laterally closed cavity with a front opening into which the leaf spring end 205 can be pushed from the front.

The elastic elastomer molded part 207 matches the shape of the receiving recess 203 and the shape of the leaf spring end 205 so that the leaf spring end, for example, is enclosed in form-fit fashion. The elastomer molded part 207 can also be opened laterally or closed laterally and form a cavity opened on one side.

If the leaf spring end 205 is shaped spherical or cylindrical or rounded on the front, the receiving recess 203 can also be spherical or cylindrical or rounded on the end. The elastomer molded part 207 and its receiving space 209 can accommodate this shape and also be designed cylindrical or spherical or rounded on the end.

The elastomer molded part 207 can be inserted or pushed into the receiving recess 203. According to one example, the elastomer molded part 207 can be bonded to the leaf spring end 205.

As shown as an example in FIG. 1, the leaf spring end 205 is thickened and has a cylindrical or rounded shape, which is accommodated by a receiving space 209 of the elastomer molded part 207.

According to one example, the elastomer molded part 207 is bonded to the receiving recess 203, for example, by vulcanization or by molding.

According to an additional example, the elastomer molded part is firmly joined to the leaf spring end 205.

According to another example, the elastomer molded part is a separate component inserted between the leaf spring end 205 and the receiving recess 203.

Because of the cylindrical shape of the leaf spring end 205 and the correspondingly partially cylindrical shape of the receiving recess 203, rotational movement of the leaf spring end 205 can be additionally encouraged in the receiving recess 203.

The leaf spring mounting part is fastened to a vehicle structure 213 depicted schematically in FIG. 1 by means of a bearing 211. Fastening can occur by means of bonding, for example, a welded joint, or by a force-fit connection.

The leaf spring mounting part 201 can also have a mold section 215 that at least partially encloses the vehicle structure 215.

For example, the bearing 211 can be formed in the shape of a bracket that encloses the vehicle structure 215.

Figure 2:
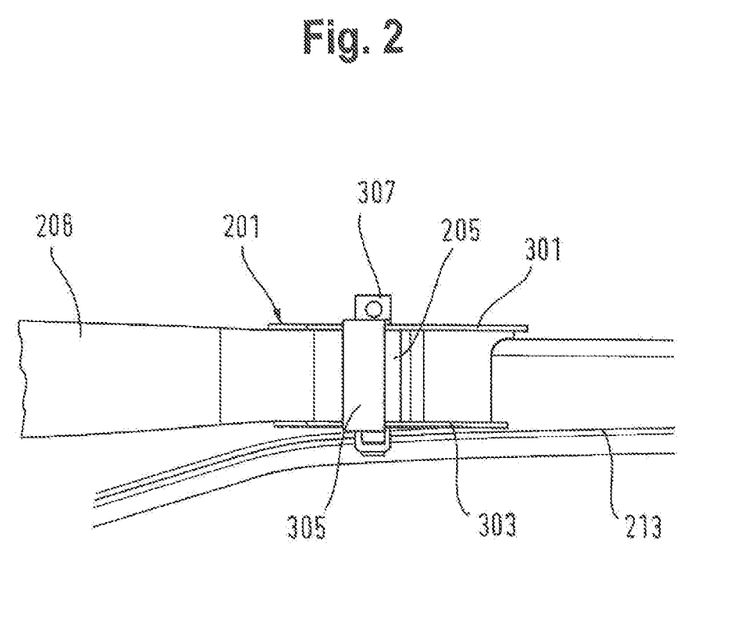
FIG. 2 shows a bottom view of the leaf spring retaining element depicted in FIG. 1.

FIG. 2 shows a bottom view of the leaf spring retaining element 200 depicted in FIG. 1, which has side arms 301, 303 according to one example, which are arranged laterally on the leaf spring mounting part 201. In addition, a locking bracket 305 is provided, which engages beneath the leaf spring mounting part 201 and therefore locks the leaf spring end 205 in the receiving recess 203.

The locking bracket 305 can have angled tabs 307 for screw fastening.

Figure 3:
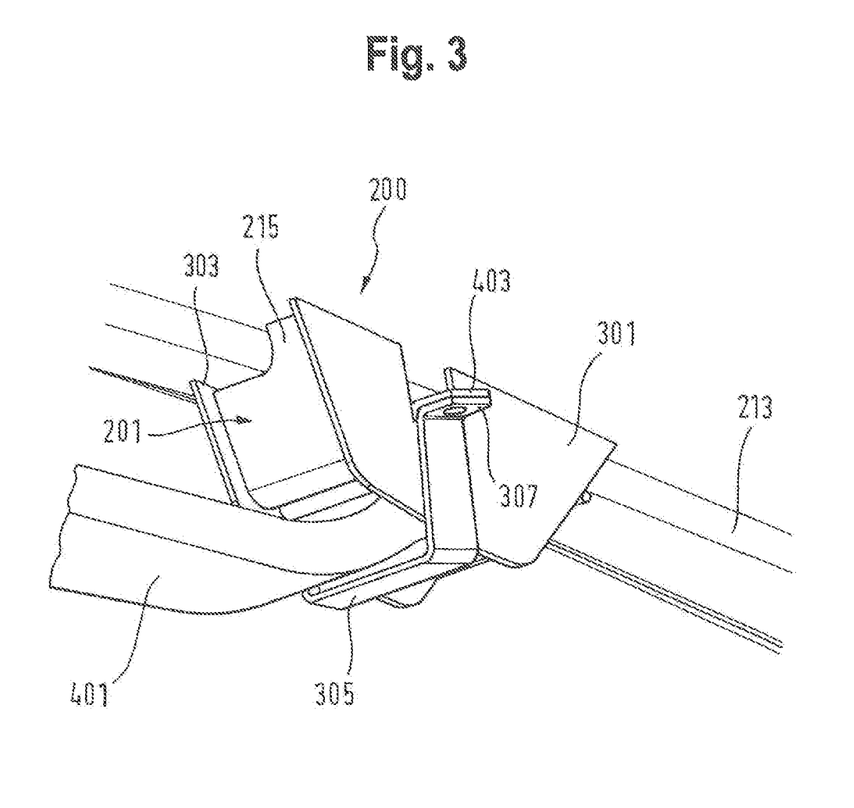
FIG. 3 shows a view of the leaf spring retaining element depicted in FIG. 1.

FIG. 3 shows a leaf spring retaining element 200 with a leaf spring 401, which is bent toward the leaf spring end. The locking bracket 305 secures the leaf spring end of leaf spring 401, which can be shaped like the leaf spring end 205, from falling out of the receiving recess 203. The side arms 301, 303 can have angled tabs 403 for screw fastening with the angled tabs 307.

Figure 4:
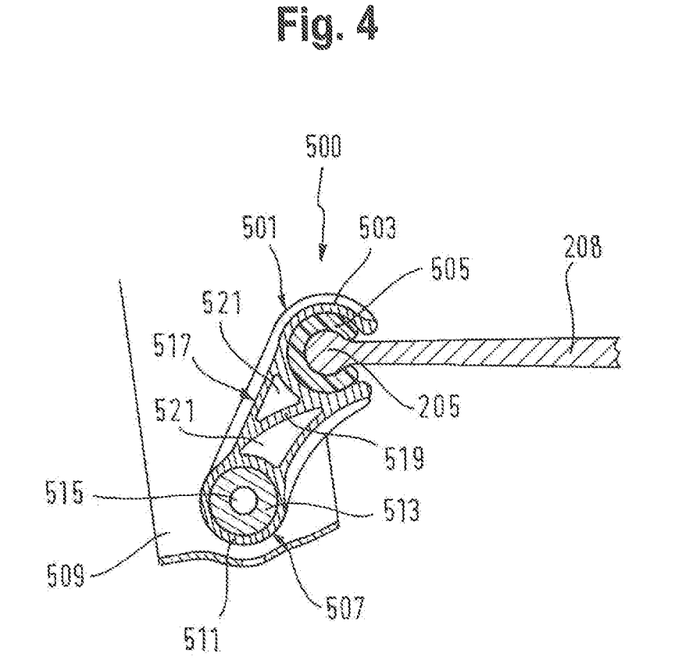
FIG. 4 shows a leaf spring retaining element.

FIG. 4 shows a leaf spring retaining element 500 according to another embodiment. The leaf spring retaining element 500 has a leaf spring mounting part 501 with a receiving recess 503 for mounting a leaf spring end, for example, leaf spring end 205 of the leaf spring 208 depicted as an example.

An elastomer molded part 505 is arranged in the receiving recess 503, which can correspond to the elastomer molded part 207 depicted in FIG. 1. The leaf spring retaining element 500 also has a bearing 507, which is provided for support of the leaf spring mounting part 501 on a schematically depicted vehicle structure 509. Bearing 507 includes a bearing eye 511 with a sleeve 513 depicted as an example, having a passage 515 that can be traversed by a bearing pin.

The leaf spring retaining element 500 also has an elastically deformable impact area 517 with at least a plastically deformable connector 519 as well as cavities 521 on both sides of the plastically deformable connector 519.

The leaf spring mounting part 501 depicted in FIG. 4 can be mounted to rotate on the vehicle structure 509. The elastomer molded part 505 also permits rotationally elastic mounting of the leaf spring end 205, which is caused by elastic deformation of the elastomer molded part 505.

To mount the mentioned leaf spring mounting parts on the vehicle structure, a retainer can also be provided, which holds the corresponding bearing.

Figure 5:
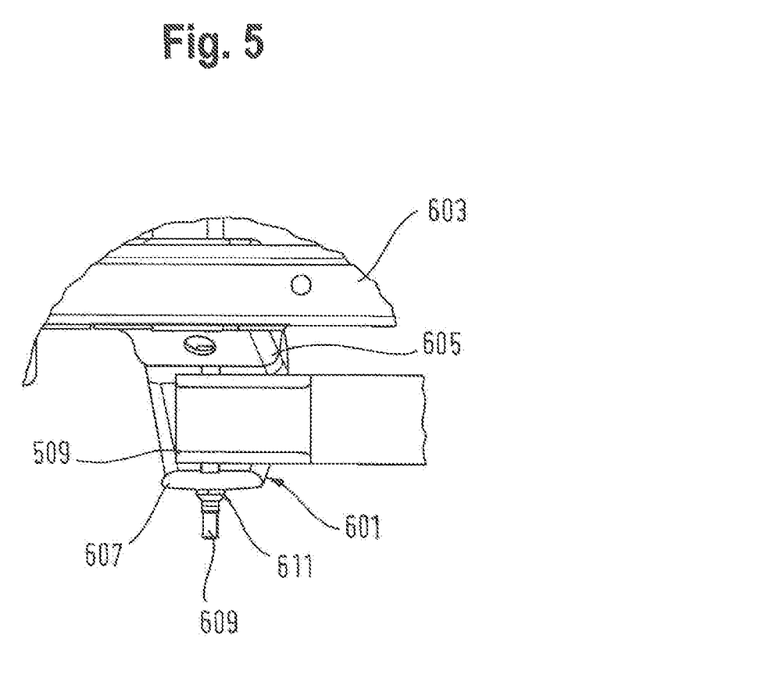
FIG. 5 shows a retainer.

FIG. 5 shows a retainer 601, which is provided to support, for example, the bearing 509 of the leaf spring retaining element 500 depicted in FIG. 5. The retainer 601 is fastened to a vehicle structure 603 and includes side arms 605, 607 that accommodate the bearing 509 on both sides. The bearing 509 is held in retainer 601 by means of a bearing pin 609 which passes through the bearing eye 511. The bearing pin can be locked by means of a nut 611, which compresses the side arms 605, 607, so that the bearing 509 is clamped in retainer 601.

LIST OF REFERENCE NUMBERS

200 Leaf spring mounting part
201 Leaf spring mounting part
203 Receiving recess
205 Leaf spring end
207 Elastomer molded part
208 Leaf spring
209 Receiving space
211 Bearing
213 Vehicle structure
215 Mold section
301 Side arm
303 Side arm
305 Locking bracket
307 Tab
401 Leaf spring
403 Tab
500 Leaf spring retaining element
501 Leaf spring mounting part
503 Receiving recess
505 Elastomer molded part
507 Bearing
509 Vehicle structure
511 Bearing eye
513 Sleeve
515 Passage
517 Impact area
519 Connector
521 Cavity
601 Retainer
603 Vehicle structure
605 Side arm
607 Side arm
609 Bearing pin
611 Nut

What is claimed is:

1. A leaf spring retaining element for rotationally and elastically mounting a leaf spring end of a leaf spring on a vehicle structure, comprising:
a leaf spring mounting part comprising a receiving recess to accommodate the lea spring end, wherein the leaf spring mounting part has a mold section that at least partially encloses the vehicle structure;
an elastomer molded part configured to rotationally and elastically mount the leaf spring end, wherein the elastomer molded part is arranged in the receiving recess and shaped to at least partially enclose the leaf spring end, wherein the leaf spring end is closed by a rounded, thickened front; and a bearing configured to support the leaf spring mounting part on the vehicle structure, wherein the bearing comprises a bearing eye for rotatable mounting of the leaf spring retaining element on the vehicle structure;

wherein the bearing comprises a plastically deformable impact area configured to accommodate impact energy, wherein the plastically deformable impact area comprises a number of plastically deformable connectors configured to at least partially take up the impact energy by plastic deformation, wherein the impact energy originates from the leaf spring mounting part.

2. The leaf spring retaining element according to claim 1, wherein the elastomer molded part contains an elastomer.

3. The leaf spring retaining element according to claim 1, wherein the elastomer molded part is bonded with the receiving recess or mounted or clamped to move in the receiving recess.

4. The leaf spring retaining element according to claim 1, wherein the elastomer molded part is shaped to fully enclose or encase or surround a thickening of the leaf spring end.

5. The leaf spring retaining element according to claim 1, wherein the elastomer molded part comprises a receiving space, and wherein the leaf spring end is frontally or laterally insertable into the receiving space.

6. The leaf spring retaining element according to claim 5, wherein the leaf spring end comprises a thickening and the receiving space is shaped to fully enclose or encase or surround the thickening of the leaf spring end.

7. The leaf spring retaining element according to claim 5, wherein the receiving space is configured to be opened or closed laterally.

8. The leaf spring retaining element according to claim 1, wherein the leaf spring end is mountable in the leaf spring mounting part by clamping or form-fitting.

9. The leaf spring retaining element according to claim 1, wherein the leaf spring end is mountable with rotational elasticity in the receiving recess by elastic deformation of the elastomer molded part.

10. The leaf spring retaining element according to claim 1, wherein the bearing is configured to be rigidly connected to the vehicle structure.

11. The leaf spring retaining element according to claim 1, wherein the leaf spring mounting part is formed by a bent sheet metal part, Wherein the receiving recess is formed by deformation of the sheet metal part, or wherein the leaf spring mounting part is formed as a single piece with the bearing.

12. A leaf spring arrangement, comprising
a leaf spring comprising a leaf spring end; and
a leaf spring retaining element, the leaf spring retaining element comprising:
a leaf spring mounting part comprising a receiving recess to accommodate the lea spring end, wherein the leaf spring end is closed by a rounded, thickened front and has a mold section that at least partially encloses a vehicle structure;
an elastomer molded part configured to rotationally and elastically mount the leaf spring end to the vehicle structure, the elastomer molded part being arranged in the receiving recess and shaped to at least partially enclose the leaf spring end; and
a bearing configured to support the leaf spring mounting part on the vehicle structure, wherein the bearing comprises a bearing eye for rotatable mounting of the leaf spring retaining element on the vehicle structure;
wherein the bearing comprises a plastically deformable impact area configured to accommodate impact energy, wherein the plastically deformable impact area comprises a number of plastically deformable connectors configured to at least partially take up the impact energy by plastic deformation, wherein the impact energy originates from the leaf spring mounting part.

13. A vehicle, comprising:
an elastomer molded part;
a leaf spring comprising a leaf spring end, wherein the leaf spring end is closed by a rounded, thickened front;
wherein the elastomer molded part encloses the leaf spring end in form-fit fashion to rotationally and elastically mount the leaf spring end, and wherein the elastomer molded part is bonded to the leaf spring; and
a bearing comprising a bearing eye for rotatable mounting of a leaf spring retaining element on the vehicle structure; wherein the bearing comprises a plastically deformable impact area configured to accommodate impact energy, wherein the plastically deformable impact area comprises a number of plastically deformable connectors configured to at least partially take up the impact energy by plastic deformation, wherein the impact energy originates from a leaf spring mounting part of the leaf spring retaining element, wherein the leaf spring mounting part has a mold section that at Least partially encloses the vehicle structure.

14. The leaf spring according to claim 13, wherein the leaf spring end comprises a thickening.

15. The leaf spring according to claim 14, wherein the elastomer molded part is molded onto the thickening of the leaf spring end, wherein the elastomer molded part fully encloses or is molded around the thickening of the leaf spring end.

* * * * *